(12) United States Patent
Imamura

(10) Patent No.: US 12,524,113 B2
(45) Date of Patent: Jan. 13, 2026

(54) INFORMATION PROCESSING APPARATUS, CONTROL METHOD OF THE SAME, AND PROGRAM

(71) Applicant: CANON KABUSHIKI KAISHA, Tokyo (JP)

(72) Inventor: Takeru Imamura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/896,583

(22) Filed: Sep. 25, 2024

(65) Prior Publication Data

US 2025/0103165 A1 Mar. 27, 2025

(30) Foreign Application Priority Data

Sep. 25, 2023 (JP) .................. 2023-160113

(51) Int. Cl.
*G06F 3/041* (2006.01)
*G06F 3/01* (2006.01)
*G06F 3/06* (2006.01)

(52) U.S. Cl.
CPC .......... *G06F 3/0418* (2013.01); *G06F 3/0414* (2013.01); *G06F 3/01* (2013.01); *G06F 3/0625* (2013.01)

(58) Field of Classification Search
CPC ........ G06F 3/0418; G06F 3/0414; G06F 3/01; G06F 3/0625
USPC ................... 345/178, 173; 358/1.1
See application file for complete search history.

(56) References Cited

U.S. PATENT DOCUMENTS 9,769,344 B2 * 9/2017 Hikichi ............. H04N 1/00395
2018/0159999 A1 * 6/2018 Ito ........................ G06F 3/1229

FOREIGN PATENT DOCUMENTS

JP 2019059175 A 4/2019

OTHER PUBLICATIONS

Machined English Translation of Japanese Patent JP2019059175A, 45 pages (Year: 2025).*

* cited by examiner

*Primary Examiner* — Jimmy H Nguyen
(74) *Attorney, Agent, or Firm* — Canon U.S.A., Inc. IP Division

(57) ABSTRACT

An information processing apparatus includes a touch panel control unit configured to output a first signal in a case where an operation on a touch panel is received, and a first control unit configured to control the touch panel, wherein, in a case where an operation is received when a power mode of the information processing apparatus is a power saving mode, based on a return signal based on the first signal, the power mode of the information processing apparatus returns from the power saving mode to a standby mode in which power is supplied at least to the first control unit, and wherein, in a case where an operation is received when a power mode of the information processing apparatus is the standby mode, the first control unit executes a function of the touch panel based on the first signal.

11 Claims, 8 Drawing Sheets

POWER SAVING MODE

STANDBY MODE

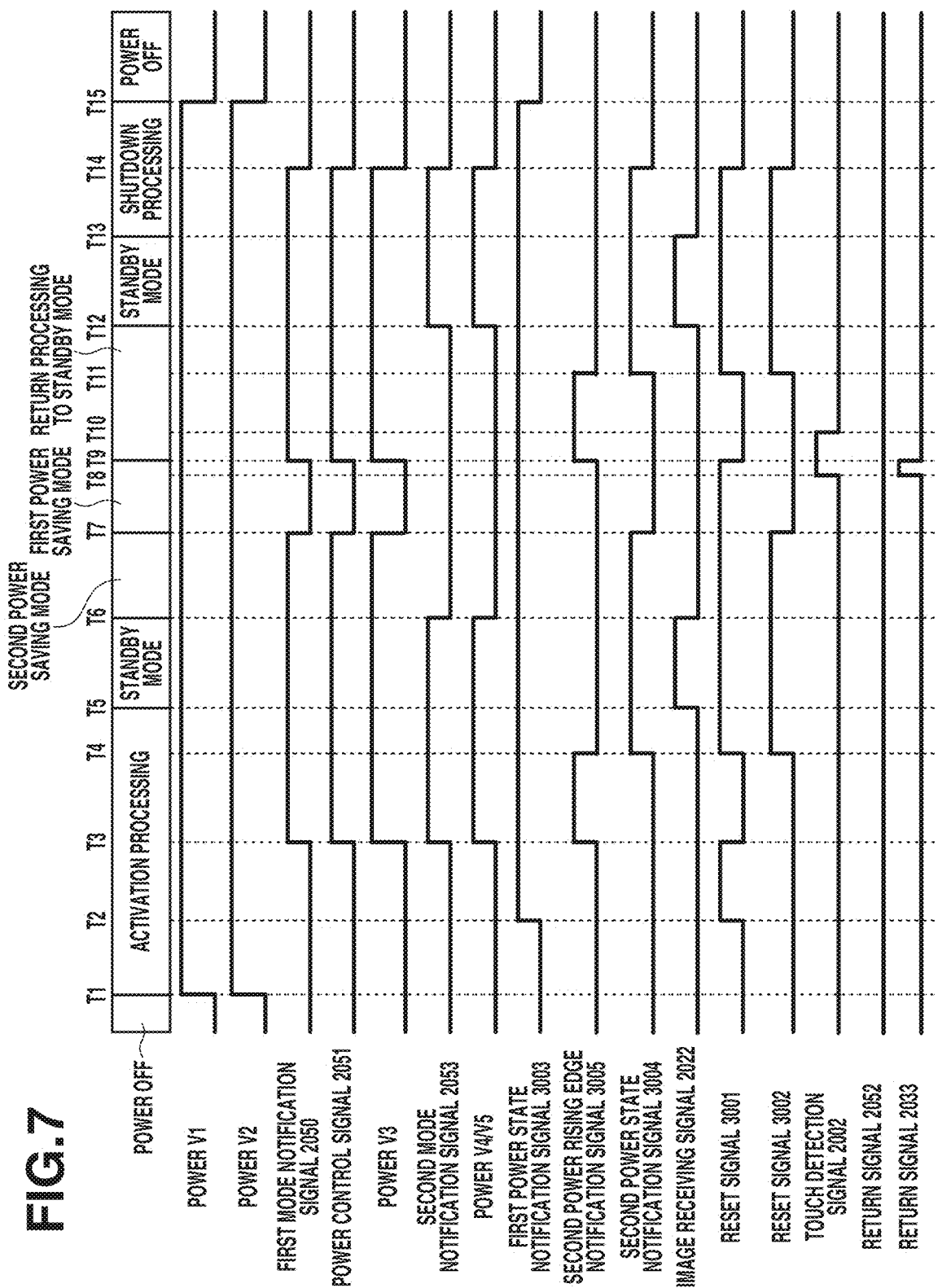

INFORMATION PROCESSING APPARATUS, CONTROL METHOD OF THE SAME, AND PROGRAM

BACKGROUND

Field of the Disclosure

The present disclosure relates to an information processing apparatus, a control method of the same, and a program.

Description of the Related Art

An information processing apparatus such as an image forming apparatus sometimes includes an input device such as a touch panel or a numerical keypad, a display device such as a liquid crystal display (LCD), and a dedicated operation unit including a control substrate equipped with a central processing unit (CPU). The operation unit includes the CPU that controls the entire operation unit and a touch panel controller that detects operations from users. If the CPU included in the operation unit detects a user operation via the touch panel controller, the CPU notifies a main control unit of the detected user operation.

The main control unit controls the information processing apparatus in accordance with the user operation by performing power control and coordinate acquisition in accordance with the user operation.

On the other hand, power saving in such an information processing apparatus has been demanded. There has been known a technique of achieving power saving by switching a device to be supplied with power, in accordance with a state of a power saving mode when an information processing apparatus operates in the power saving mode. A technique discussed in Japanese Patent Application Laid-Open No. 2019-59175 includes an operation unit including a circuit that detects an operation from the user, and switches a device that supplies power to a part related to a print operation or an information processing operation, based on an input instruction of the user.

SUMMARY

The present disclosure is directed to providing an information processing apparatus that achieves power saving by saving power to an unnecessary part in an operation unit in a power saving mode state that includes a sub CPU, and a control method of the same.

According to an aspect of the present disclosure, an information processing apparatus includes a touch panel control unit configured to output a first signal in a case where an operation on a touch panel is received, and a first control unit configured to perform control in such a manner as to execute a function of the touch panel, wherein, in a case where an operation on the touch panel is received when a power mode of the information processing apparatus is a power saving mode in which power is not supplied at least to the first control unit, based on a return signal generated by a generation unit based on the first signal, the power mode of the information processing apparatus returns from the power saving mode to a standby mode in which power is supplied at least to the first control unit, and wherein, in a case where an operation on the touch panel is received when a power mode of the information processing apparatus is the standby mode, the first control unit executes a function of the touch panel based on the first signal.

Further features of the present disclosure will become apparent from the following description of exemplary embodiments with reference to the attached drawings.

BRIEF DESCRIPTION OF THE DRAWINGS

FIG. 7 is a timing chart illustrating behavior examples of internal signals in the power reset control unit according to the first exemplary embodiment and major power/signals to be input and output.

DESCRIPTION OF THE EMBODIMENTS

Hereinafter, the present exemplary embodiment will be described with reference to the drawings. The components described in the following exemplary embodiment are mere examples, and are not intended to limit the components to these.

<System Configuration>

Figure 1:
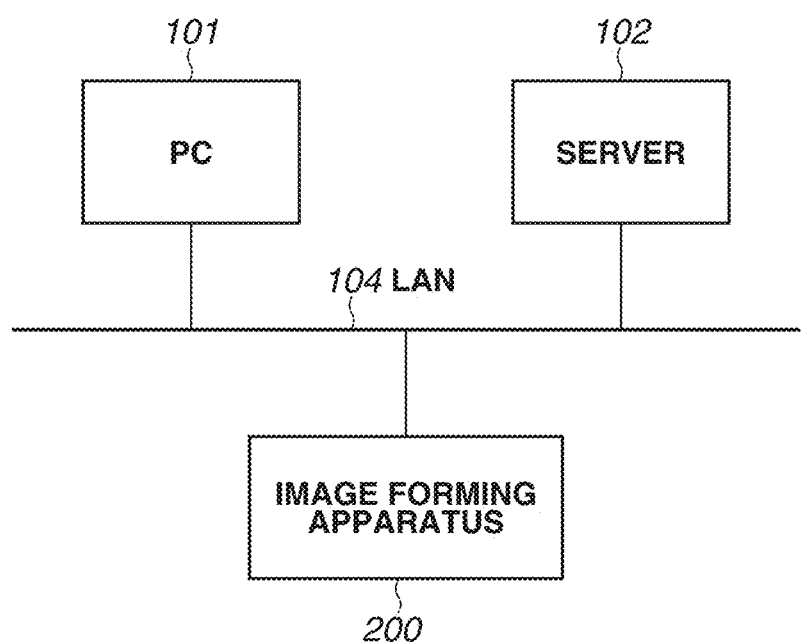
FIG. 1 is a block diagram illustrating a configuration example of an image forming system.

FIG. 1 is a diagram illustrating a configuration example of an image forming system according to the first exemplary embodiment. The description will be given of an example in which the present exemplary embodiment is applied to an image forming apparatus that performs image formation, as an example of an information processing apparatus. The present exemplary embodiment can be applied to any information processing apparatus including a control unit that generates image data for screen display, a display unit on which a screen is to be displayed based on the image data generated by the control unit, and an operation unit that receives a user operation. For example, the present exemplary embodiment can also be applied to an information processing apparatus such as a printing apparatus, a reading apparatus, a copier, and facsimile apparatus.

In the image forming system illustrated in FIG. 1, a personal computer (PC) 101, a server 102, and an image forming apparatus 200 are connected to a local area network (LAN) 104. The server 102 is a computer that provides a service in accordance with a request from a client apparatus such as the PC 101 or the image forming apparatus 200.

In accordance with a user operation, the PC 101 or the server 102 generates a print job including data described in a printing language such as a page-description language (PDL) or data in a specific data format (compressed in compliance with the Joint Bi-level Image Experts Group (JBIG), etc.). The PC 101 or the server 102 transmits the generated print job to the image forming apparatus 200 via the LAN 104. When the image forming apparatus 200 receives a print job from an external apparatus such as the PC 101 or the server 102, the image forming apparatus 200 executes image formation (printing) in accordance with the received print job.

The PC 101 or the server 102 can make remote access to the image forming apparatus 200 via the LAN 104. The PC 101 or the server 102 is configured to be able to operate the image forming apparatus 200 and monitor the state of the image forming apparatus 200 by the remote access. The image forming apparatus 200 is configured to be able to notify an external apparatus such as the PC 101 or the server 102 of the state of the image forming apparatus 200.

<Configuration of Image Forming Apparatus 200>

Figure 2:
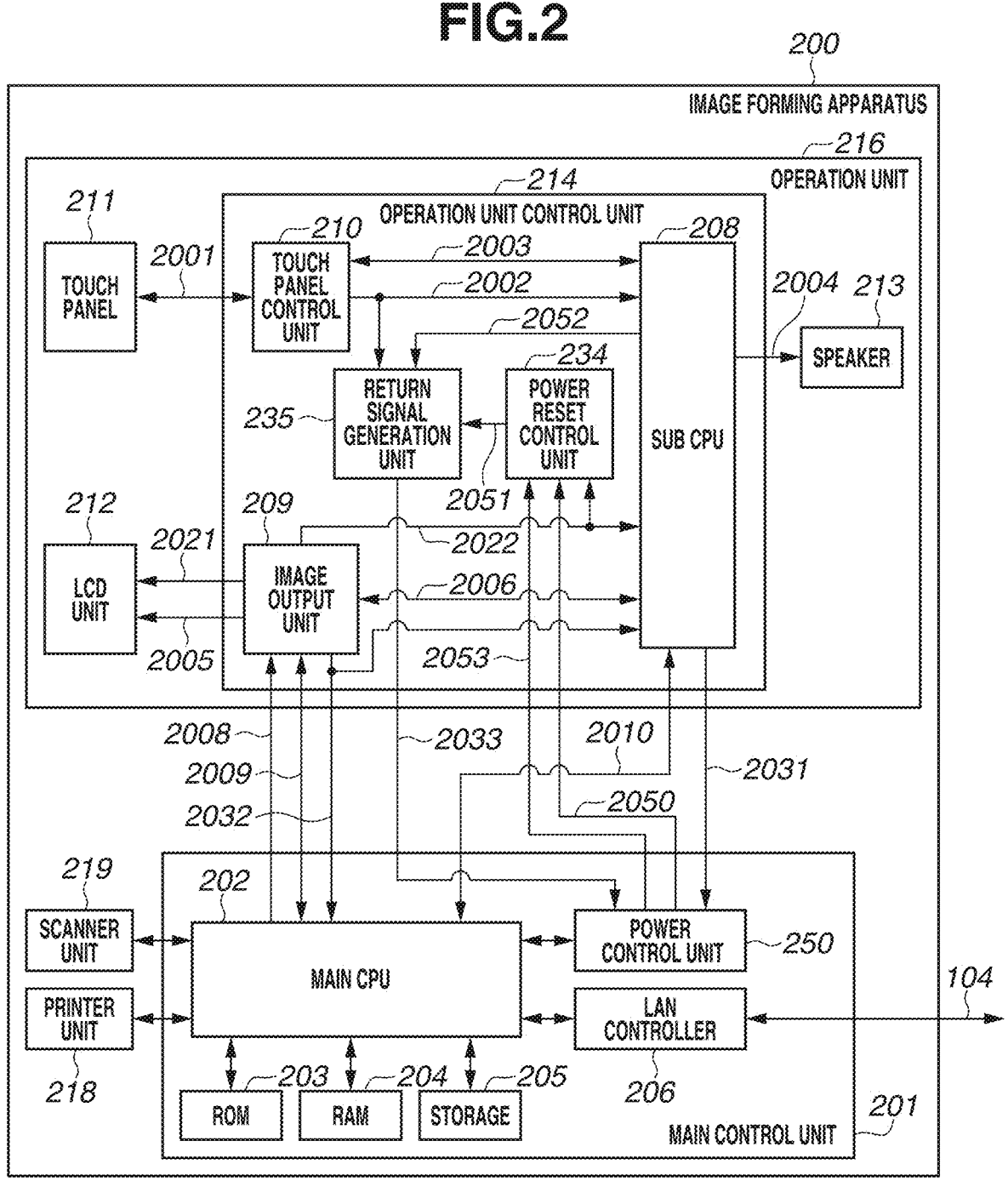
FIG. 2 is a block diagram illustrating a hardware configuration example of an image forming apparatus.

FIG. 2 is a block diagram illustrating a hardware configuration example of the image forming apparatus 200. The image forming apparatus 200 includes a main control unit 201, an operation unit 216, a printer unit 218, and a scanner unit 219.

The main control unit 201 includes a main central processing unit (CPU) 202 (first CPU) and controls the entire image forming apparatus 200.

The operation unit 216 functions as a user interface (UI), and includes a sub CPU 208 (second CPU), an input device (touch panel 211) that receives user operations, and a display device (LCD unit 212) that displays a screen.

In the present exemplary embodiment, the main control unit 201 functions as an example of a control unit that generates image data for screen display on the LCD unit 212 and outputs the image data to the operation unit 216.

The operation unit 216 includes the LCD unit 212 (display unit), and functions as an example of an operation unit that displays a screen on the LCD unit 212 (display unit) based on the image data generated by the main control unit 201 and that receives a user operation.

The image data for screen display needs not be always generated by the main control unit 201 as in the present exemplary embodiment and may be generated by the sub CPU 208 or the like in the operation unit 216.

The printer unit 218 performs image formation processing on a recording medium (sheet) in the form of a sheet in accordance with an electrophotographic method, for example. The method to be employed by the printer unit 218 is not limited to the electrophotographic method. The printer unit 218 may employ another recording method such as an inkjet method or a thermal transfer method.

The main control unit 201 includes the main CPU 202, a read-only memory (ROM) 203, a random access memory (RAM) 204, a storage 205, a LAN controller 206, and a power control unit 250. The main control unit 201 implements a print function by controlling the printer unit 218 to print an image in accordance with a print job received from an external apparatus, for example. The main control unit 201 also implements a copy function by controlling the scanner unit 219 and the printer unit 218 to print an image based on image data obtained from a document image read by the scanner unit 219.

The main CPU 202 controls the entire image forming apparatus 200. By reading out a program stored in the ROM 203 or the storage 205 and executing the program, the main CPU 202 implements the function of the image forming apparatus 200 such as the print function and the copy function. The RAM 204 includes a volatile memory such as a double-data-rate synchronous dynamic random access memory (DDR SDRAM). The RAM 204 is used to store a program to be executed by the main CPU 202, and temporary data to be used by the main CPU 202. The storage 205 is a storage device such as a solid state drive (SSD) that is connected with the main CPU 202 by the serial advanced technology attachment (ATA), for example. The storage 205 is used to temporarily store various types of setting information regarding the image forming apparatus 200 and image data to be used in the print function or the copy function. The LAN controller 206 is connected with the main CPU 202 and the LAN 104. The LAN controller 206 controls communication with an external apparatus such as the PC 101 or the server 102 that is performed via the LAN 104.

As operation modes, the image forming apparatus 200 according to the present exemplary embodiment has a first power saving mode, a second power saving mode, and a standby mode. In the standby mode, power is supplied to the main CPU 202 from a power source (not illustrated), and the main CPU 202 is in an operable state.

In the first power saving mode, power is not supplied to the main CPU 202 from the power source, and the main CPU 202 is not in the operable state. The first power saving mode is an operation mode with smaller consumed power of the image forming apparatus 200 as compared with those in the second power saving mode and the standby mode. In the first power saving mode, power supply to devices such as the printer unit 218 and the scanner unit 219 is also stopped.

In the second power saving mode, power is supplied to the main CPU 202 from the power source, and the main CPU 202 is in a partially-operable state. The second power saving mode is an operation mode with smaller consumed power of the image forming apparatus 200 than that in the standby mode, and is an operation mode with larger consumed power than that in the first power saving mode. In the second power saving mode as well, power supply to devices such as the printer unit 218 and the scanner unit 219 is also stopped.

In the present exemplary embodiment, a power source (not illustrated) of the image forming apparatus 200 is provided in the main control unit 201.

The power control unit 250 performs power control of the entire image forming apparatus 200. In a case where power is not supplied to the main CPU 202 and the printer unit 218/the scanner unit 219, the power control unit 250 performs on/off control of the power source in the image forming apparatus 200 provided in the main control unit 201. In a case where power is supplied to the main CPU 202 and the printer unit 218/the scanner unit 219, the main CPU 202 performs on/off control of power supply to each unit by controlling the power control unit 250. The power control by the power control unit 250 may be implemented by a CPU of the power control unit 250 executing a program, or may be implemented by a hardware logic such as a programmable logic device (PLD).

Being triggered by a return signal 2033 from the operation unit 216 or a return signal (not illustrated) from the LAN controller 206, the power control unit 250 performs on/off control of the power source in the image forming apparatus 200. The power control unit 250 thereby shifts the image forming apparatus 200 from the first and second power saving modes to the standby mode. The power control unit 250 further controls power V1 (to be described below with reference to FIG. 3) to the operation unit 216.

The operation unit 216 is connected with the main control unit 201 via an image data signal 2008, a communication signal 2009, and a communication signal 2010. Furthermore, the operation unit 216 is connected with the main control unit 201 via a READY signal 2031, a READY signal 2032, the return signal 2033, a first mode notification signal 2050, and a second mode notification signal 2053.

The READY signal 2031 is a signal indicating that the sub CPU 208 is in an operable state (state of being able to receive the communication signal 2010).

The READY signal 2032 is a signal indicating that an image output unit 209 is in a state of being able to receive the communication signal 2009 and the image data signal 2008, and is a signal to be transmitted as a notification from the image output unit 209 to the main CPU 202 and the sub CPU 208 in the operation unit 216.

The return signal 2033 is a signal for returning the main control unit 201 (the image forming apparatus 200) from a sleep state (power saving mode) and is transmitted from a return signal generation unit 235 to the power control unit 250.

The first mode notification signal 2050 and the second mode notification signal 2053 are signals for notifying a power reset control unit 234 in the operation unit 216 of a power mode of the main control unit 201 (the image forming apparatus 200). The signals notify the power reset control unit 234 whether the power mode at the time is the first power saving mode, the second power saving mode, or the standby mode.

The image output unit 209 of the operation unit 216 receives an instruction or information from the main control unit 201 via the image data signal 2008, the communication signal 2009, and the communication signal 2010, and performs the display control of the LCD unit 212.

The operation unit 216 also notifies, via the communication signal 2010, the main control unit 201 of a user operation received via the touch panel 211.

By monitoring the first mode notification signal 2050 and the second mode notification signal 2053, the power reset control unit 234 of the operation unit 216 determines a current operation mode of the main control unit 201. Specifically, the operation unit 216 determines whether the operation mode of the main control unit 201 is the first power saving mode, the second power saving mode, or the standby mode.

On the other hand, by monitoring the READY signal 2031, the main CPU 202 determines whether the sub CPU 208 is in the operable state (state of being able to receive the communication signal 2010). By monitoring the READY signal 2032, the main CPU 202 further determines whether the image output unit 209 is in a state of being able to receive the communication signal 2009 and the image data signal 2008.

The operation unit 216 includes an operation unit control unit 214, the touch panel 211, the LCD unit 212, and a speaker 213.

The operation unit control unit 214 includes the sub CPU 208, a touch panel control unit 210, the image output unit 209, the power reset control unit 234, and the return signal generation unit 235.

The touch panel control unit 210 is connected with the sub CPU 208, the touch panel 211, and the return signal generation unit 235.

The touch panel control unit 210 is connected with the touch panel 211 via a control signal 2001. By monitoring the control signal 2001, the touch panel control unit 210 detects touch input to the touch panel 211.

Using a touch detection signal 2002, the touch panel control unit 210 also notifies the sub CPU 208 and the return signal generation unit 235 of detection information indicating that touch has been input to the touch panel 211 from the user.

The touch panel control unit 210 also performs communication with the sub CPU 208 via a control signal 2003.

The sub CPU 208 is also called an operation unit CPU, and transmits setting information for appropriately detecting touch input by correcting touch sensitivity to the touch panel 211 and a touch coordinate deviation on the touch panel 211, to the touch panel control unit 210 via the control signal 2003.

The sub CPU 208 also receives the detection information indicating that touch has been input to the touch panel 211, from the touch panel control unit 210 via the touch detection signal 2002.

Furthermore, if the sub CPU 208 receives the detection information from the touch panel control unit 210, the sub CPU 208 reads input operation data corresponding to an input operation performed by the user, from the touch panel control unit 210 via the control signal 2003. The input operation data includes data on a touched coordinate and a pressing pressure.

The sub CPU 208 transmits the input operation data received from the touch panel control unit 210, to the main CPU 202 via the communication signal 2010.

The image output unit 209 is connected with the LCD unit 212, and controls image display on the LCD unit 212. That is, the image output unit 209 functions as an example of an image output circuit that generates an image signal for screen display based on the image data received from the main control unit 201 and outputs the image signal to the LCD unit 212. The image output unit 209 controls the LCD unit 212 using an image output signal 2005 and a backlight control signal 2021. The backlight control signal 2021 is used for on/off control of a backlight of the LCD unit 212 (lighting control) and the setting of brightness.

The image output unit 209 is also connected with the main CPU 202 and the sub CPU 208.

The image output unit 209 exchanges a control signal 2006 with the sub CPU 208. The image output unit 209 also exchanges the image data signal 2008, the communication signal 2009, and the READY signal 2032 with the main CPU 202.

The READY signal 2032 is a signal output from the image output unit 209 to the main CPU 202 and used to notify the main CPU 202 whether the image output unit 209 can receive the communication signal 2009 and the image data signal 2008.

An image receiving signal 2022 is output from the image output unit 209 and is used to notify the power reset control unit 234 whether an image to be displayed on the LCD unit 212 has been received from the main CPU 202 to the image output unit 209 based on the image data signal 2008.

The image receiving signal 2022 is connected not only to the power reset control unit 234 but also to the sub CPU 208 in such a manner that the sub CPU 208 can monitor the image receiving signal 2022.

The READY signal 2032 output from the image output unit 209 is connected not only to the main CPU 202 but also to the sub CPU 208 in such a manner that the sub CPU 208 can monitor the READY signal 2032. The sub CPU 208 can thereby monitor the image receiving signal 2022, and the READY signal 2032 indicating whether the image output unit 209 can receive image data.

The main CPU 202 transmits image data of a screen to be displayed on the LCD unit 212, to the image output unit 209 included in the operation unit control unit 214, as the image data signal 2008. Using the communication signal 2009, the main CPU 202 transmits setting information for the setting of screen display such as the setting of a size or an orientation of a screen to be displayed on the LCD unit 212, to the image output unit 209.

The image output unit 209 generates an image signal that can be received by the LCD unit 212, based on the image data received from the main CPU 202 as the image data signal 2008 and the setting information received as the communication signal 2009. The image output unit 209 transmits the generated image signal to the LCD unit 212 as the image output signal 2005. The image output unit 209 generates, for example, a low voltage differential signaling (LVDS) signal or an analog or digital red-green-blue (RGB) signal, as an image signal that can be received by the LCD unit 212.

The LCD unit 212 displays a screen in accordance with the image output signal 2005 received from the image output unit 209.

After the image data and the setting information have been received from the main CPU 202, if the image output unit 209 enters a state of being able to output an image to the LCD unit 212, the image output unit 209 notifies the power reset control unit 234 of the state using the image receiving signal 2022.

The sub CPU 208 performs the on/off control of the backlight of the LCD unit 212 (lighting control) and the setting of brightness for the image output unit 209 via the control signal 2006.

The sub CPU 208 controls the speaker 213 using a control signal 2004. For example, the sub CPU 208 causes the speaker 213 to output push sound indicating that user input has been received and voice indicating an operation instruction to the user or information such as the state of the image forming apparatus 200. The control of the speaker 213 may be performed by the main CPU 202 instead of the sub CPU 208.

The power reset control unit 234 performs the power control and the reset control of the entire operation unit 216.

The power reset control unit 234 monitors a first mode notification signal 2050 from the power control unit 250, and determines whether the main control unit 201 (the image forming apparatus 200) is in the first power saving mode, the second power saving mode, or the standby mode.

After that, the power reset control unit 234 performs the power control of the entire operation unit 216 by turning on/off the power source in the operation unit 216 that is provided in the operation unit control unit 214. Then, the power reset control unit 234 shifts the operation unit 216 to the first power saving mode, the second power saving mode, or the standby mode similarly to the main control unit 201.

Furthermore, the power reset control unit 234 notifies the return signal generation unit 235 of a power control signal 2051 to generate a return signal in accordance with the determined state of the image forming apparatus 200, i.e., the first power saving mode, the second power saving mode, or the standby mode.

The power reset control unit 234 also generates a reset signal to a device in the operation unit control unit 214 by monitoring an on/off state of the power source in the operation unit 216 that is provided in the operation unit control unit 214.

The power reset control by the power reset control unit 234 may be implemented by a hardware logic or may be implemented by a CPU such as a microcomputer executing a program.

The return signal generation unit 235 receives information indicating a change in user input to the touch panel 211, from the touch panel control unit 210 via the touch detection signal 2002 from the touch panel control unit 210.

The return signal generation unit 235 generates the return signal 2033 based on the received touch detection signal 2002, a return signal 2052 generated by the sub CPU 208, and the power control signal 2051 received from the power reset control unit 234. Accordingly, by notifying the power control unit 250 of the return signal 2033, the return signal generation unit 235 returns the main control unit 201 (the image forming apparatus 200) from the first or second power saving mode to the standby mode.

<Configuration of Power Reset Control Unit 234>

Figure 3:
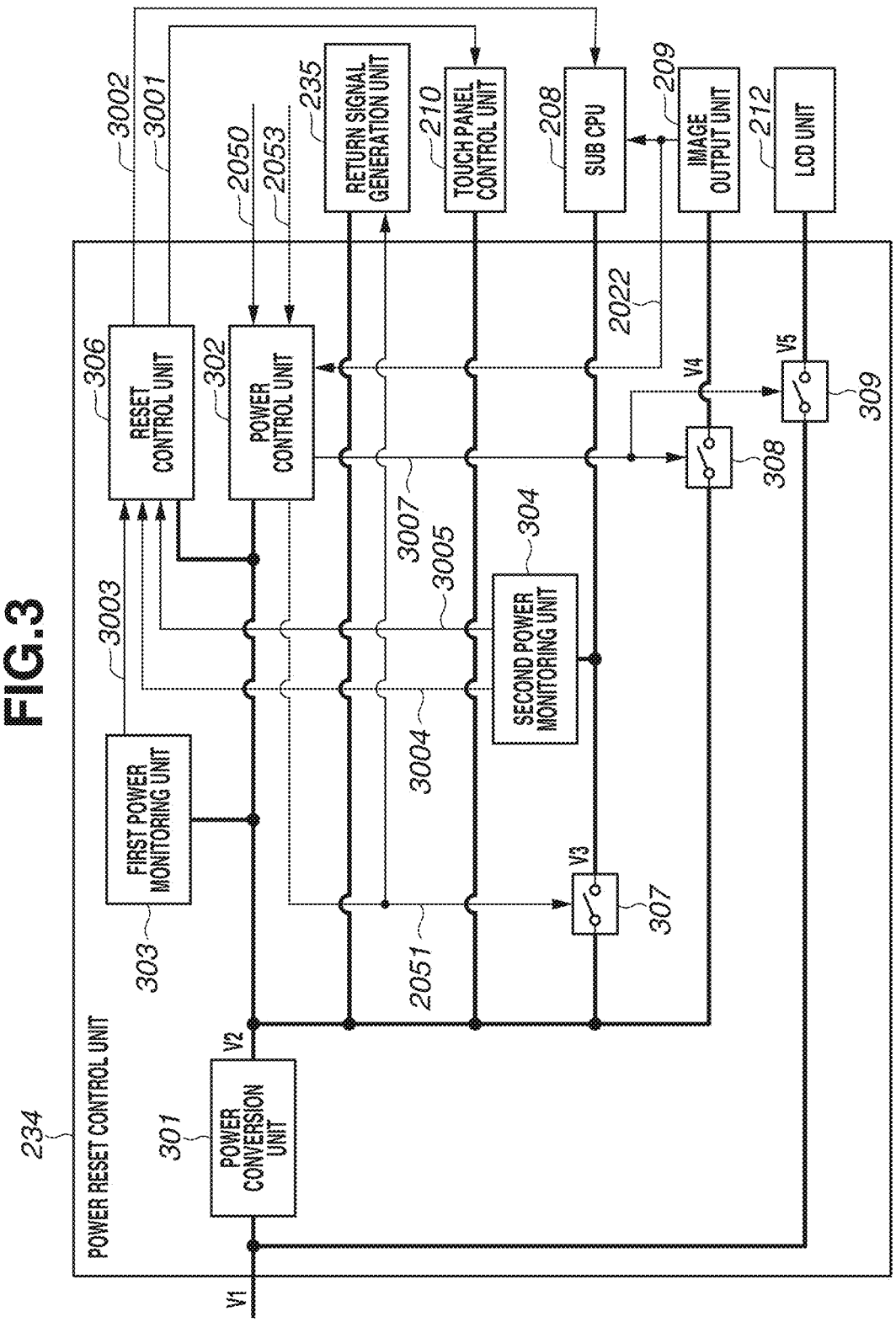
FIG. 3 is a block diagram illustrating a hardware configuration example of a power reset control unit.

FIG. 3 is a block diagram illustrating a hardware configuration example of the power reset control unit 234.

The power reset control unit 234 include a power conversion unit 301, a power control unit 302, a first power monitoring unit 303, a second power monitoring unit 304, a reset control unit 306, and switches 307, 308, and 309.

The power V1 from the power control unit 250 of the main control unit 201 is supplied to the power reset control unit 234. As an example of the power V1, direct-current power of 12 V is supplied.

The power conversion unit 301 converts the supplied power V1 into power V2. As an example of the power V2, the power conversion unit 301 converts the power V1 into direct-current power of 3.3 V. As an example, the power conversion unit 301 functions as a regulator that decreases the voltage from 12 V to 3.3 V.

The power V2 is supplied to the touch panel control unit 210, the return signal generation unit 235, the power control unit 302, the first power monitoring unit 303, and the reset control unit 306.

The power control unit 302 monitors the first mode notification signal 2050 and the second mode notification signal 2053 from the power control unit 250, and the image receiving signal 2022 from the image output unit 209. The power control unit 302 generates the power control signal 2051 for controlling ON/OFF of the switch 307, and a power control signal 3007 for controlling ON/OFF of the switches 308 and 309.

The first power monitoring unit 303 performs voltage monitoring of the power V2, monitors whether the power V2 is stably supplied, and notifies the reset control unit 306 of a first power state notification signal 3003.

The second power monitoring unit 304 performs voltage monitoring of power V3, monitors whether the power V3 is stably supplied, and notifies the reset control unit 306 of a second power state notification signal 3004.

Furthermore, the second power monitoring unit 304 performs voltage behavior monitoring of the power V3, and the second power monitoring unit 304 notifies the reset control unit 306 of a second power rising edge notification signal 3005 only when the rising edge of the power V3 is detected.

The reset control unit 306 generates a reset signal 3001 to the touch panel control unit 210 and a reset signal 3002 to the sub CPU 208 based on the first power state notification signal 3003, the second power state notification signal 3004, and the second power rising edge notification signal 3005.

The switch 307 generates the power V3 to be supplied to the sub CPU 208, by turning ON/OFF the power V2 based on the power control signal 2051 from the power control unit 302.

The switch 308 generates power V4 to be supplied to the image output unit 209, from the power V2 based on a power control signal 3007 from the power control unit 302.

The switch 309 generates power V5 to be supplied to the LCD unit 212, from the power V1 based on the power control signal 3007 from the power control unit 302.

<Configuration of Reset Control Unit 306>

Figure 4:
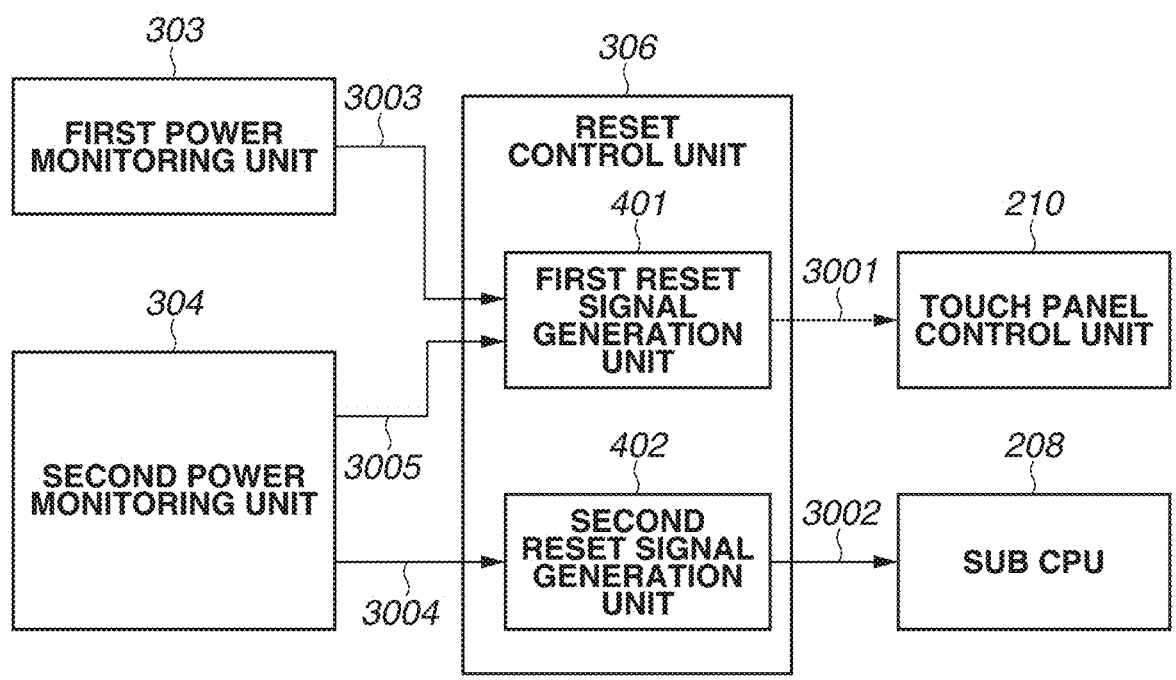
FIG. 4 is a block diagram illustrating a hardware configuration example of a reset control unit.

FIG. 4 is a block diagram illustrating a hardware configuration example of the reset control unit 306.

The reset control unit 306 includes a first reset signal generation unit 401 and a second reset signal generation unit 402.

The first reset signal generation unit 401 generates the reset signal 3001 to the touch panel control unit 210 based on the first power state notification signal 3003 from the first power monitoring unit 303 and the second power rising edge notification signal 3005 from the second power monitoring unit 304.

The second reset signal generation unit 402 generates the reset signal 3002 to the sub CPU 208 based on the second power state notification signal 3004 from the second power monitoring unit 304.

<Configuration of Return Signal Generation Unit 235>

Figure 5A:
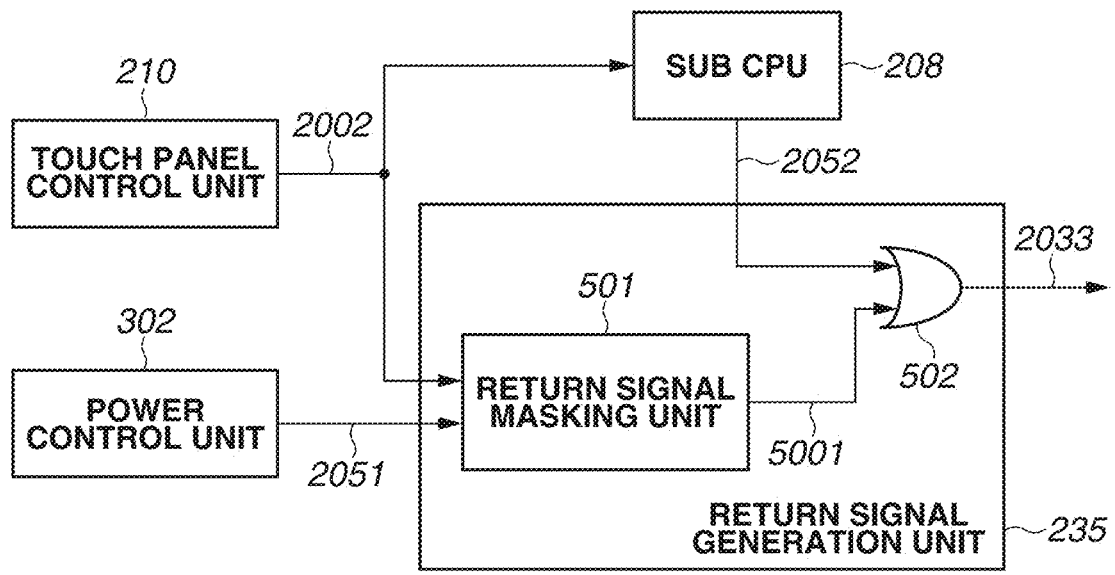
FIG. 5A is a block diagram illustrating a hardware configuration example of a return signal generation unit.

FIG. 5A is a block diagram illustrating a hardware configuration example of the return signal generation unit 235.

The return signal generation unit 235 includes a return signal masking unit 501 and a logical addition (OR) gate 502.

The return signal masking unit 501 performs signal masking of the touch detection signal 2002 from the touch panel control unit 210, using the power control signal 2051 from the power control unit 302, and outputs a masked return signal 5001 to the OR gate 502.

In a case where the power control signal 2051 is set to ON, the return signal masking unit 501 masks the touch detection signal 2002 and outputs the masked return signal 5001 as a disabled signal.

In a case where the power control signal 2051 is set to OFF, the return signal masking unit 501 outputs the masked return signal 5001 as an enabled signal without masking the touch detection signal 2002.

The OR gate 502 performs the OR of the return signal 2052 from the sub CPU 208 and the masked return signal 5001 from the return signal masking unit 501, and outputs a resultant signal as the return signal 2033.

The description has been given of an exemplary embodiment in which, as an example of the return signal generation unit 235, the return signal masking unit 501 and the OR gate 502 each include a logic circuit, and if the touch detection signal 2002 is received, the masked return signal 5001 is output by being disabled. Nevertheless, an exemplary embodiment is not limited to the described exemplary embodiment. A CPU or the like may be used. The exemplary embodiment may be an exemplary embodiment in which the touch detection signal 2002 is received and ignored, or an exemplary embodiment in which the touch detection signal 2002 is not received in the first place.

Figure 5B:
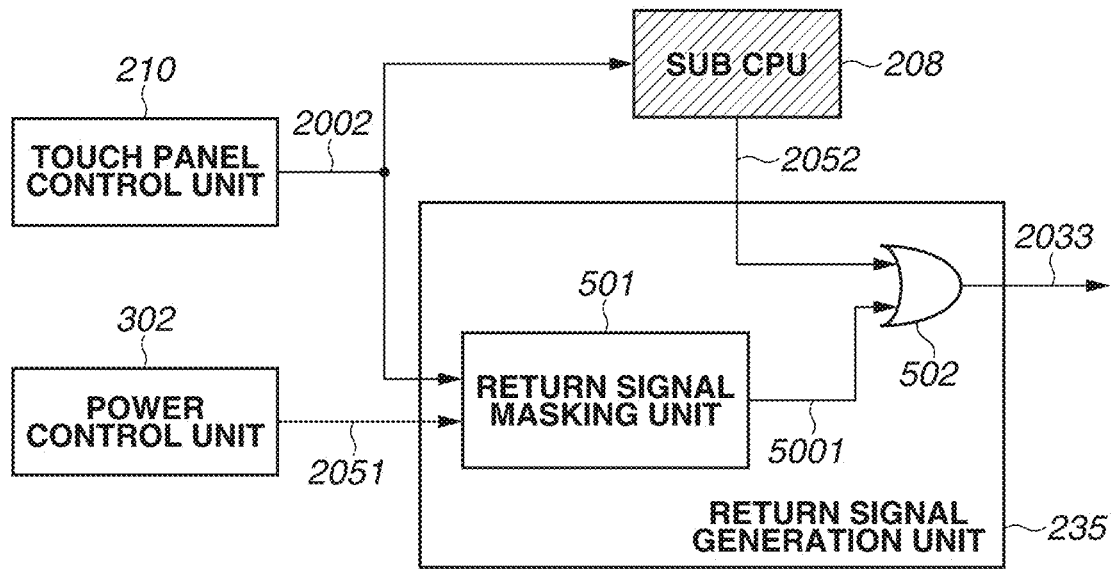
FIG. 5B is a block diagram illustrating a power supply state of each block connected to the return signal generation unit in a power saving state.

FIG. 5B is a block diagram illustrating a power supply state of each block connected to the return signal generation unit 235 in the first power saving state.

The behavior of the return signal generation unit 235 in each power state of the image forming apparatus 200 will be described with reference to FIGS. 5A and 5B.

First of all, when the image forming apparatus 200 is in the standby mode, power is supplied to the sub CPU 208 as illustrated in FIG. 5A, and the power control signal 2051 from the power control unit 302 is set to ON.

Accordingly, the touch detection signal 2002 input from the touch panel control unit 210 to the return signal masking unit 501 is masked by the return signal masking unit 501, and the masked return signal 5001 is output as a disabled signal.

On the other hand, the sub CPU 208 uses the touch detection signal 2002 as a trigger for reading out, from the touch panel control unit 210, input operation data of the user that has been received on the touch panel 211 via the control signal 2003. This is because, in the standby mode, the touch detection signal 2002 indicates that touch has been input to the touch panel 211, in a case where the user touches the touch panel 211 in a state where an image is displayed on the LCD unit 212.

For this reason, in the standby mode, even in a case where the touch detection signal 2002 is enabled, the sub CPU 208 outputs the return signal 2052 as a disabled signal.

Next, when the image forming apparatus 200 is in the first power saving mode, power is not supplied to the sub CPU 208 as illustrated in FIG. 5B, and the power control signal 2051 from the power control unit 302 is set to OFF.

Accordingly, the touch detection signal 2002 input from the touch panel control unit 210 to the return signal masking unit 501 is not masked by the return signal masking unit 501, and the masked return signal 5001 is output as an enabled signal.

When the image forming apparatus 200 is in the second power saving mode, power is supplied to the sub CPU 208 as illustrated in FIG. 5A, and the power control signal 2051 from the power control unit 302 is set to ON.

Accordingly, the touch detection signal 2002 input from the touch panel control unit 210 to the return signal masking unit 501 is masked by the return signal masking unit 501, and the masked return signal 5001 is output as a disabled signal.

On the other hand, the sub CPU 208 uses the touch detection signal 2002 for the generation of a return signal from the second power saving mode. This is because, in the second power saving mode, the touch detection signal 2002 indicates that the image forming apparatus 200 is to return from the power saving mode, in a case where the user touches the touch panel 211 in a state where an image is not displayed on the LCD unit 212.

For this reason, in the second power saving mode, in a case where the touch detection signal 2002 is enabled, the sub CPU 208 outputs the return signal 2052 as an enabled signal.

A flow of controlling the image forming apparatus 200 when the user touches the touch panel 211 in each power mode will be described with reference to FIGS. 6A and 6B. The control flow of the image forming apparatus 200 in the power saving modes will be described with reference to FIG. 6A. The control flow of the image forming apparatus 200 in the standby mode will be described with reference to FIG. 6B.

First, the control flow in the power saving modes will be described with reference to FIG. 6A. In the power saving modes, if the touch panel 211 is touched by the user, the touch panel control unit 210 outputs the touch detection signal 2002 indicating that user touch has been detected, to the return signal generation unit 235.

At this time, because power is not supplied to the sub CPU 208 as illustrated in FIG. 5B, the touch detection signal 2002 is masked to prevent the touch detection signal 2002 from being output to the sub CPU 208. At this time, even when a signal is input to the sub CPU 208 in a power-off state, if a good protection function is provided, electric output may be performed without masking the output in terms of a signal although the touch cannot be detected because power is not supplied to the sub CPU 208.

If touch is detected based on the touch detection signal 2002, the return signal generation unit 235 outputs the return signal 2033 to the power control unit 250 of the image forming apparatus 200. If the power control unit 250 receives the return signal 2033, to shift the image forming apparatus 200 from the power saving mode to the standby mode, the power control unit 250 performs the control of supplying power to each block.

Next, the control flow in the standby mode will be described with reference to FIG. 6B. In the standby mode, when the touch panel 211 is touched by the user, the touch panel control unit 210 outputs the touch detection signal 2002 indicating that user touch has been detected, to the sub CPU 208. When the sub CPU 208 detects user touch, the sub CPU 208 issues an acquisition request for input operation data (information regarding a touched coordinate and a pressing pressure) corresponding to an input operation of the user that has been received on the touch panel 211 via the control signal 2003, and reads out the input operation data from the touch panel control unit 210. In some cases, user input is performed to correct touch sensitivity or coordinate deviation. However, the description will be given assuming that the user input is an operation for the user operating the image forming apparatus 200, as a representative of the user input. As an example of a specific method by which the sub CPU 208 reads out the input operation data from the touch panel control unit 210, by transmitting a specific command using the control signal 2003, the sub CPU 208 acquires the input operation data indicating a coordinate on the touch panel 211, from the touch panel control unit 210. Commands to be transmitted from the sub CPU 208 include a command for data acquisition of an input operation and a command for correction of touch sensitivity or a coordinate deviation. The details will not be described. In the standby mode, the touch panel control unit 210 transmits the touch detection signal 2002 indicating that user touch has been detected, also to the return signal generation unit 235, but the signal is not received in the standby mode. A method of avoiding receiving a signal may be a method of electrically stopping the touch detection signal 2002, or a method of disabling the return signal generation unit 235. The method of disabling the return signal generation unit 235 includes a method of avoiding outputting a signal by disabling the return signal generation unit 235 based on the power state being the standby mode, for example. At this time, the method of avoiding outputting a signal includes a method of avoiding outputting a signal in the operation unit 216, and a method of avoiding outputting a signal to the power control unit 250 in the main control unit 201. Alternatively, a signal may be ignored in the power control unit 250 depending on the power state. The method of disabling the return signal generation unit 235 by the power control unit 250 includes a method of disabling the return signal generation unit 235 based on the power state being the standby mode.

The sub CPU 208 transmits the input operation data received from the touch panel control unit 210, to the main CPU 202 via the communication signal 2010.

The main CPU 202 determines the user input based on screen information and coordinate information, and operates the image forming apparatus 200. In an acquisition flow of the input operation data, the sub CPU 208 mainly acquires the data from the touch panel control unit 210. Nevertheless, the sub CPU 208 may notify the main CPU 202 that touch detection has been received, and the main CPU 202 may read out the user input data via the sub CPU 208.

Figure 6A:
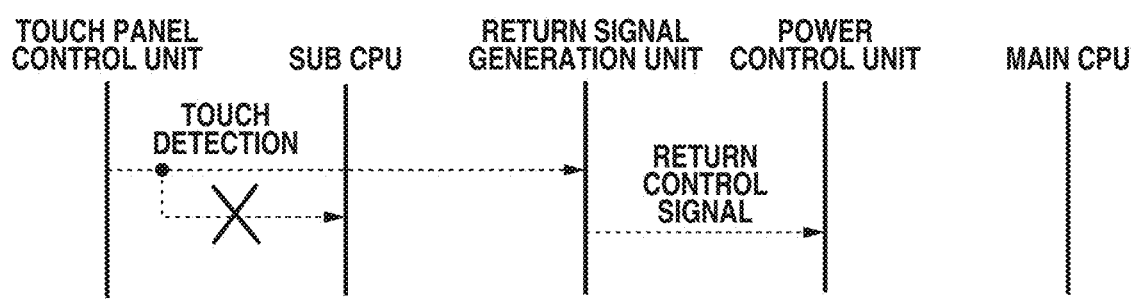
FIG. 6A is a flow diagram illustrating a touch panel control flow in a power saving mode.
Figure 6B:
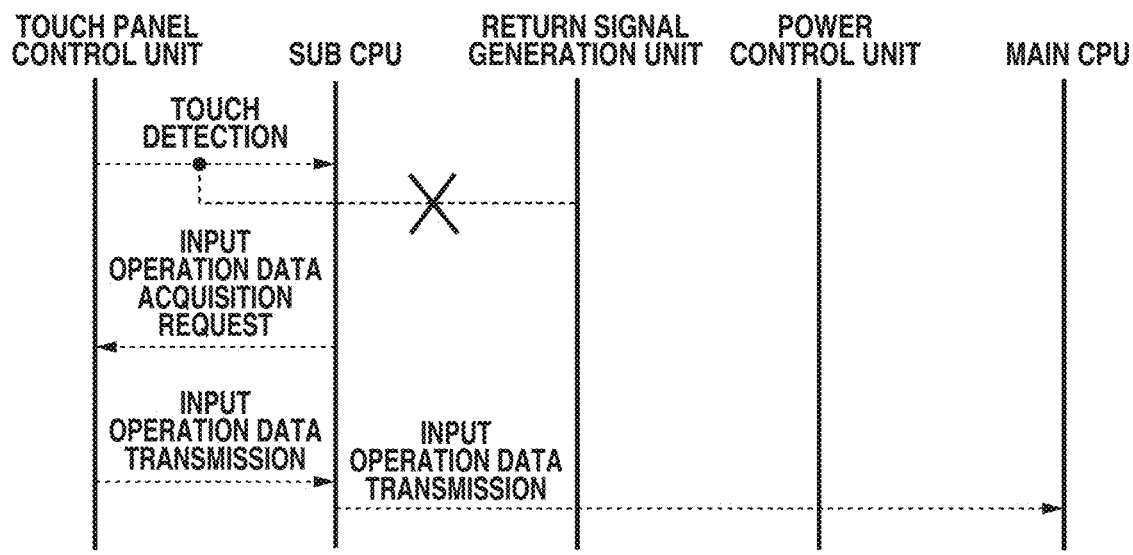
FIG. 6B is a flow diagram illustrating a touch panel control flow in a standby mode.

As illustrated in FIGS. 6A and 6B, in the power saving mode, the touch detection signal 2002 is used for power control for returning to the standby mode, and in the standby mode, the touch detection signal 2002 is used as a trigger for user input data acquisition. In this manner, by changing how the touch detection signal 2002 is used depending on the power mode, it becomes possible to turn the power of the sub CPU 208 off in the power saving mode. At this time, the touch detection signal 2002 may be electrically masked or may be disabled in terms of software. Alternatively, instead of preparing two use applications of the touch detection signal 2002, a method of executing control while performing switching may be employed.

<Timing Chart of Major Power and Signals>

FIG. 7 is a timing chart illustrating behavior examples of internal signals in the power reset control unit 234 and major power/signals to be input and output.

At a time T1, if a power switch (not illustrated) is turned ON by a user operation, the power V1 is first supplied from the power control unit 250 of the main control unit 201, and furthermore, the power V2 is generated by the power conversion unit 301 from the power V1, and activation processing of the image forming apparatus 200 is started.

At a time T2, if the first power monitoring unit 303 detects that the power V2 has started to be stably supplied, the first power monitoring unit 303 changes the first power state notification signal 3003 from LOW to HIGH, and notifies the reset control unit 306 that the power V2 is in a stably-supplied state.

Furthermore, at the time T2, the first reset signal generation unit 401 in the reset control unit 306 detects that the first power state notification signal 3003 has changed from LOW to HIGH. Then, the first reset signal generation unit 401 changes the reset signal 3001 to the touch panel control unit 210 from LOW to HIGH, and changes the state from a reset state to a reset cancel state.

At a time T3, the power control unit 250 of the main control unit 201 initially changes the outputs of the first mode notification signal 2050 and the second mode notification signal 2053 from LOW to HIGH, and notifies the operation unit 216 that the main control unit 201 is being activated.

By the outputs of the first mode notification signal 2050 and the second mode notification signal 2053 being simultaneously changed from LOW to HIGH, the power reset control unit 234 of the operation unit 216 detects that the main control unit 201 is being activated. Furthermore, at the time T3, the power control unit 302 of the operation unit 216 changes the first mode notification signal 2050 from LOW to HIGH. If the power control unit 302 detects that the main control unit 201 is being activated, the power control unit 302 changes the power control signal 2051 from LOW to HIGH to turn the switch 307 ON, and causes the switch 307 to start the supply of the power V3.

Furthermore, at the time T3, if the power control unit 302 detects that the second mode notification signal 2053 has been changed from LOW to HIGH, the power control unit 302 changes the power control signal 3007 from LOW to HIGH. The power control unit 302 thereby turns the switches 308 and 309 ON, and causes the switches 308 and 309 to start the supply of the power V4 and the power V5.

Furthermore, at the time T3, if the second power monitoring unit 304 detects that the supply of the power V3 has been started, the second power monitoring unit 304 changes the output of the second power rising edge notification signal 3005 from LOW to HIGH. The second power monitoring unit 304 thereby notifies the reset control unit 306 that the supply of the power V3 has been started.

Furthermore, at the time T3, when the first reset signal generation unit 401 detects that the second power rising edge notification signal 3005 has been changed from LOW to HIGH, the first reset signal generation unit 401 changes the output of the reset signal 3001 from HIGH to LOW. The first reset signal generation unit 401 thereby once brings the touch panel control unit 210 into the reset state.

At a time T4, when the second power monitoring unit 304 detects that the power V3 has started to be stably supplied, the second power monitoring unit 304 changes the output of the second power state notification signal 3004 from LOW to a HIGH state.

Furthermore, the second power monitoring unit 304 changes the output of the second power rising edge notification signal 3005 from HIGH to LOW, and notifies the reset control unit 306 that the power V3 has started to be stably supplied.

Furthermore, at the time T4, the first reset signal generation unit 401 of the reset control unit 306 detects that the second power rising edge notification signal 3005 has changed from HIGH to LOW.

Accordingly, the output of the reset signal 3001 to the touch panel control unit 210 is changed again from LOW to HIGH. The touch panel control unit 210 is thereby released from the reset state.

Furthermore, at the time T4, the second reset signal generation unit 402 of the reset control unit 306 changes the output of the reset signal 3002 from LOW to HIGH, and releases the sub CPU 208 from the reset state. With this configuration, when the image forming apparatus 200 shifts to the standby mode, it is possible to reset not only the sub CPU 208 but also the touch panel control unit 210.

At a time T5, if the image output unit 209 receives a display image to be displayed on the LCD unit 212, from the main CPU 202, the image output unit 209 changes the image receiving signal 2022 from LOW to HIGH. Then, the image output unit 209 issues a notification indicating that a display image to be displayed on the LCD unit 212 has started to be received from the main CPU 202, and further starts to display the display image on the LCD unit 212.

Based on the change of the image receiving signal 2022 from LOW to HIGH, the Power reset control unit 234 of the operation unit 216 detects that the operation mode of the image forming apparatus 200 has changed to the standby mode.

The activation of the image forming apparatus 200 is completed by the processing during the time T1 to time T5, and the operation mode of the image forming apparatus 200 from time T5 to time T6 is the standby mode.

At the time T6, in a case where the power control unit 250 of the main control unit 201 detects that the image forming apparatus 200 has not been operated for a certain period of time in the standby mode, or in a case where a power saving mode shift instruction is input by the user, the power control unit 250 shifts the main control unit 201 to the second power saving mode. Then, the main CPU 202 stops the transmission of the display image to the LCD unit 212.

Furthermore, at the time T6, the power control unit 250 of the main control unit 201 changes the output of the second mode notification signal 2053 from HIGH to LOW, and notifies the operation unit 216 that the main control unit 201 shifts to the second power saving mode.

By the output of the second mode notification signal 2053 changing from HIGH to LOW while the output of the first mode notification signal 2050 being kept HIGH, the power reset control unit 234 of the operation unit 216 detects that the main control unit 201 shifts to the second power saving mode.

Furthermore, at the time T6, if the image output unit 209 of the operation unit 216 detects that the transmission of the display image from the main CPU 202 to the LCD unit 212 has been stopped, the image output unit 209 changes the image receiving signal 2022 from HIGH to LOW. Then, the image output unit 209 notifies the sub CPU 208 that the transmission of the display image to the LCD unit 212 has been stopped.

Furthermore, at the time T6, when the power control unit 302 of the operation unit 216 detects that the second mode notification signal 2053 has been changed from HIGH to LOW, the power control unit 302 changes the output of the power control signal 3007 from HIGH to LOW. Then, the power control unit 302 blocks the supply of the power V4 and the power V5 by turning the switches 308 and 309 OFF.

Furthermore, at the time T6, image display on the LCD unit 212 is also turned OFF by the supply of the power V4 and the power V5 being blocked.

The operation mode of the image forming apparatus 200 from the time T6 to time T7 is the second power saving mode.

At the time T7, in a case where the power control unit 250 of the main control unit 201 detects that the image forming apparatus 200 has not been operated by the user for a certain period of time in the second power saving mode, the power control unit 250 changes the output of the first mode notification signal 2050 from HIGH to LOW. Then, the power control unit 250 issues a notification indicating that the main control unit 201 shifts to the first power saving mode.

Furthermore, at the time T7, if the power control unit 302 detects that the first mode notification signal 2050 has been changed from HIGH to LOW, the power control unit 302 changes the output of the power control signal 2051 from HIGH to LOW, and blocks the supply of the power V3 by turning the switch 307 OFF.

Furthermore, at the time T7, if the second power monitoring unit 304 detects that the supply of the power V3 has been blocked, the second power monitoring unit 304 changes the second power state notification signal 3004 from HIGH to LOW, and notifies the reset control unit 306 that the supply of the power V3 has been blocked.

Furthermore, at the time T7, if the reset control unit 306 detects that the second power state notification signal 3004 has been changed from HIGH to LOW, the reset control unit 306 changes the output of the reset signal 3002 from HIGH to LOW, and brings the sub CPU 208 into the reset state.

The operation mode of the image forming apparatus 200 from time T7 to time T9 is the first power saving mode.

At the time T7, the image forming apparatus 200 shifts to the first power saving mode and the sub CPU 208 enters the reset state, but the reset signal 3001 to the touch panel control unit 210 remains in the reset cancel state. Accordingly, the touch panel control unit 210 keeps holding setting information for detecting touch input that has been set by the sub CPU 208 in the standby mode, even after the image forming apparatus 200 has shifted to the first power saving mode, and it becomes possible to detect touch on the touch panel 211 with an appropriate setting.

At a time T8, if the touch panel control unit 210 detects touch input to the touch panel 211 from the user, the touch panel control unit 210 changes the output of the touch detection signal 2002 to the return signal generation unit 235 from LOW to HIGH. The touch panel control unit 210 thereby notifies the return signal generation unit 235 that the touch panel 211 is being touched.

Furthermore, at the time T8, because the power control signal 2051 is set to LOW (i.e., the power V3 is set to OFF), the return signal masking unit 501 does not mask the touch detection signal 2002, and outputs the masked return signal 5001 in the HIGH state as an enabled signal. The OR gate 502 outputs the return signal 2033 in the HIGH state as an enabled signal, and issues an instruction to the power control unit 250 of the main control unit 201 to return the image forming apparatus 200 to the standby mode. On the other hand, the return signal 2052 to be output by the sub CPU 208 is in a disabled state because the power V3 to the sub CPU 208 is set to OFF.

At the time T9, the power control unit 250 of the main control unit 201 detects that the return signal 2033 from the operation unit 216 is set to HIGH as an enabled signal. Accordingly, the power control unit 250 changes the output of the first mode notification signal 2050 to HIGH, and notifies the operation unit 216 that the image forming apparatus 200 returns to the standby mode.

Furthermore, at the time T9, if the power control unit 302 of the operation unit 216 detects that the first mode notification signal 2050 has been changed to HIGH, the power control unit 302 changes the output of the power control signal 2051 to HIGH, and starts the supply of the power V3 by turning the switch 307 ON.

Furthermore, at the time T9, if the second power monitoring unit 304 detects that the supply of the power V3 has been started, the second power monitoring unit 304 changes the output of the second power rising edge notification signal 3005 from LOW to HIGH, and notifies the reset control unit 306 that the supply of the power V3 has been started. Furthermore, at the time T9, the first reset signal generation unit 401 of the reset control unit 306 detects that the second power rising edge notification signal 3005 has been changed to HIGH. Accordingly, the first reset signal generation unit 401 changes the reset signal 3001 from HIGH to LOW and once brings the touch panel control unit 210 into the reset state.

Furthermore, at the time T9, because the power control signal 2051 has been changed to HIGH (i.e., the power V3 is set to ON), the return signal generation unit 235 masks the touch detection signal 2002, changes the return signal 2033 to LOW, and outputs the return signal 2033 as a disabled signal.

At a time T10, the touch panel control unit 210 detects that touch input to the touch panel 211 from the user has been released, and notifies the return signal generation unit 235 that the touch panel 211 is not touched. Specifically, the touch panel control unit 210 notifies the return signal generation unit 235 that the touch panel 211 is not touched, by changing the touch detection signal 2002 from HIGH to LOW.

At a time T11, if the second power monitoring unit 304 detects that the power V3 has started to be stably supplied, the second power monitoring unit 304 changes the output of the second power state notification signal 3004 from LOW to the HIGH state. Furthermore, the second power monitoring unit 304 changes the second power rising edge notification signal 3005 from HIGH to LOW, and notifies the reset control unit 306 that the power V3 has started to be stably supplied.

Furthermore, at the time T11, the first reset signal generation unit 401 of the reset control unit 306 detects that the second power rising edge notification signal 3005 has been changed from HIGH to LOW. Then, the first reset signal generation unit 401 changes the output of the reset signal 3001 to the touch panel control unit 210 again from LOW to HIGH, and releases the touch panel control unit 210 from the reset state.

Furthermore, at the time T11, the second reset signal generation unit 402 of the reset control unit 306 changes the output of the reset signal 3002 from LOW to HIGH, and releases the sub CPU 208 from the reset state.

In the first power saving mode, by a touch panel control unit (slave device) operating in the absence of a sub CPU (master device), a setting value or a correction value for touch panel control might deviate. With the above-described configuration, when the image forming apparatus 200 shifts from the first power saving mode to the standby mode, it is possible to reset not only the sub CPU 208 but also the touch panel control unit 210. Thus, even when a setting value or a correction value deviates in the first power saving mode, because the value can be returned to a normal value, an operation can be normally continued.

At a time T12, the power control unit 250 of the main control unit 201 changes the output of the second mode notification signal 2053 from LOW to HIGH, and issues a notification indicating that the activation processing of the main control unit 201 has been completed and the main control unit 201 has shifted to the standby mode.

Furthermore, at the time T12, when the power control unit 302 detects that the second mode notification signal 2053 has been changed from LOW to HIGH, the power control unit 302 changes the power control signal 3007 from LOW to HIGH. The power control unit 302 thereby starts the supply of the power V4 and the power V5 by turning the switches 308 and 309 ON.

At the time T12, by the supply of the power V4 and the power V5 being started, the image output unit 209 starts to display the display image received from the main CPU 202, on the LCD unit 212.

By the processing in the time T9 to time T12, the return processing of the image forming apparatus 200 from the first power saving mode to the standby mode is completed. Nevertheless, if the rising edge of the power V3 to the sub CPU 208 is detected, the reset signal 3001 to the touch panel control unit 210 once enters the reset state. If the power V3 starts to be stably supplied, the reset signal 3001 to the touch panel control unit 210 and the reset signal 3002 to the sub CPU 208 simultaneously enter the reset cancel state.

With this configuration, even in a case where setting information or correction information for detecting touch input that is held in the first power saving mode deviates, by being once reset, the touch panel control unit 210 becomes touch-detectable. In other words, because a setting for detecting touch input is made again by the sub CPU 208 by the reset, it is possible to detect touch on the touch panel 211 with an appropriate setting even after the image forming apparatus 200 has returned to the standby mode.

The operation mode of the image forming apparatus 200 from the time T12 to time T13 is the standby mode.

At the time T13, if the power switch (not illustrated) is turned OFF by a user operation, the main control unit 201 first starts shutdown processing of the image forming apparatus 200. Then, the main CPU 202 stops the transmission of the display image to the LCD unit 212 of the operation unit 216.

Furthermore, at the time T13, when the image output unit 209 of the operation unit 216 further detects that the transmission of the display image from the main CPU 202 to the LCD unit 212 has been stopped, the image output unit 209 changes the image receiving signal 2022 from HIGH to LOW. Then, the image output unit 209 notifies the sub CPU 208 that the transmission of the display image to the LCD unit 212 has been stopped.

At a time T14, the power control unit 250 of the main control unit 201 simultaneously changes the first mode notification signal 2050 and the second mode notification signal 2053 from HIGH to LOW. Then, the power control unit 250 notifies the operation unit 216 that the main control unit 201 is executing the shutdown processing.

Furthermore, at the time T14, if the power control unit 302 of the operation unit 216 detects that the second mode notification signal 2053 has been changed from HIGH to LOW, the power control unit 302 changes the output of the power control signal 3007 from HIGH to LOW. Then, the power control unit 302 blocks the supply of the power V4 and the power V5 by turning the switches 308 and 309 OFF.

Furthermore, at the time T14, by the supply of the power V4 and the power V5 being blocked, image display on the LCD unit 212 is also turned OFF.

Furthermore, at the time T14, if the power control unit 302 of the operation unit 216 detects that the first mode notification signal 2050 has been changed from HIGH to LOW, the power control unit 302 changes the output of the power control signal 2051 from HIGH to LOW, and blocks the supply of the power V3 by turning the switch 307 OFF.

Furthermore, at the time T14, when the second power monitoring unit 304 detects that the supply of the power V3 has been blocked, the second power monitoring unit 304 changes the second power state notification signal 3004 from HIGH to LOW, and notifies the reset control unit 306 that the supply of the power V3 has been blocked.

Furthermore, at the time T14, if the reset control unit 306 detects that the second power state notification signal 3004 has been changed from HIGH to LOW, the reset control unit 306 changes the output of the reset signal 3002 from HIGH to LOW, and brings the sub CPU 208 into the reset state.

At a time T15, the power control unit 250 of the main control unit 201 blocks the supply of the power V1, and further turns OFF the supply of the power V2 converted by the power conversion unit 301 of the operation unit 216.

By the processing in the time T13 to time T15, the shutdown processing of the image output unit 209 is completed.

Figure 8:
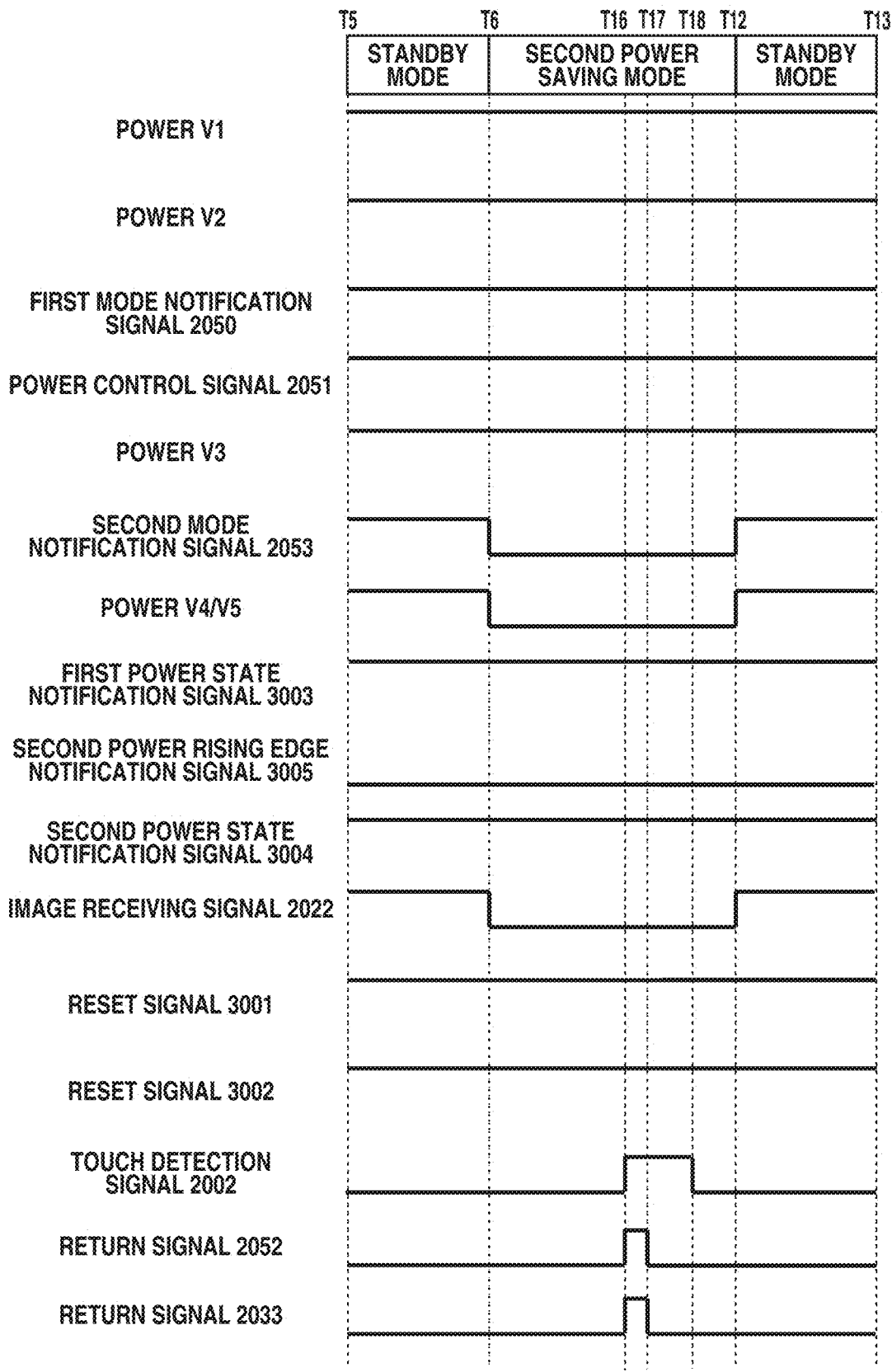
FIG. 8 is a timing chart illustrating behavior examples of internal signals in the power reset control unit according to the first exemplary embodiment and major power/signals to be input and output.

FIG. 8 is a timing chart illustrating behavior examples of internal signals in the power reset control unit 234 and major power/signals to be input and output. FIG. 7 is a timing chart illustrating behaviors performed in a case where the image forming apparatus 200 shifts to the second power saving mode, further shifts to the first power saving mode, and returns to the standby mode. On the other hand, FIG. 8 differs from FIG. 7 in that FIG. 8 is a timing chart illustrating behaviors performed in a case where the image forming apparatus 200 shifts to the second power saving mode and returns to the standby mode.

A difference from FIG. 7 lies in a section from time T6 to time T12, and the processing in the time T1 to time T6 and in the time T12 to time T15 is similar to that in FIG. 7.

Because the processing in the time T5 to time T6 of FIG. 8 is similar to that in FIG. 7, the description will be omitted.

At a time T16, when the touch panel control unit 210 detects that touch has been input to the touch panel 211 from the user, the touch panel control unit 210 changes the output of the touch detection signal 2002 to the sub CPU 208 and the return signal generation unit 235 from LOW to HIGH, and notifies the sub CPU 208 and the return signal generation unit 235 that the touch panel 211 is touched.

Furthermore, at the time T16, because the power control signal 2051 is set to HIGH (i.e., the power V3 is set to ON), the return signal masking unit 501 of the return signal generation unit 235 masks the touch detection signal 2002. The masked return signal 5001 is thereby output in a LOW state as a disabled signal.

Furthermore, at the time T16, when the sub CPU 208 detects that the touch detection signal 2002 from the touch panel control unit 210 has changed from LOW to HIGH in the second power saving mode, the sub CPU 208 outputs the return signal 2052 in the HIGH state as an enabled signal.

By the output of the second mode notification signal 2053 changing from HIGH to LOW while the output of the first mode notification signal 2050 being kept HIGH, the power reset control unit 234 of the operation unit 216 detects that the image forming apparatus 200 shifts to the second power saving mode.

Furthermore, at the time T16, because the return signal 2052 is in the HIGH state as an enabled signal, the OR gate 502 of the return signal generation unit 235 outputs the return signal 2033 in the HIGH state as an enabled signal.

At a time T17, the sub CPU 208 disables the return signal 2052 for a certain period of time, and the return signal generation unit 235 further outputs the return signal 2033 in the LOW state as a disabled signal.

At a time T18, when the touch panel control unit 210 detects that touch input to the touch panel 211 from the user has been released, the touch panel control unit 210 issues a notification indicating that the touch panel 211 is not touched.

Specifically, the touch panel control unit 210 changes the touch detection signal 2002 to the return signal generation unit 235 from HIGH to LOW.

Because the processing at a time T12 and later is similar to that in FIG. 7, the description will be omitted.

In FIG. 8, because the image forming apparatus 200 returns to the standby mode from a state in which the sub CPU 208 in the second power saving mode is operating, the return signal 2033 is generated based on a signal output by the sub CPU 208.

In contrast, in FIG. 7, because the image forming apparatus 200 returns to the standby mode from a state in which the sub CPU 208 in the first power saving mode is not operating, the return signal 2033 is generated based on a signal output by the return signal masking unit 501 in the return signal generation unit 235.

As described above, in the image forming apparatus 200 according to the present exemplary embodiment, the power reset control unit 234 performs ON/OFF control of power to each device in the operation unit 216 based on an output state of a mode notification signal from the main control unit 201. The power control of the entire operation unit 216 is thereby performed.

With this configuration, in the first power saving mode, devices in the operation unit 216 that are to be supplied with power are limited to the touch panel 211, the touch panel control unit 210, the return signal generation unit 235, and the power reset control unit 234. In the meantime, in the first power saving mode, the image forming apparatus 200 is enabled to return from the first power saving mode by touch on the touch panel 211. This can also reduce consumed power as compared with that in the second power saving mode/standby mode.

In the second power saving mode, because the sub CPU 208 is also supplied with power and the sub CPU 208 is in an operable state, the sub CPU 208 is in a state of being able to acquire a touched coordinate from the touch panel control unit 210. Thus, the image forming apparatus 200 can return to the standby mode based on a return trigger other than the detection of touch on the touch panel 211 (e.g., return to the standby mode only when a specific region is touched).

In this manner, return control to the standby mode may be changed between the first power saving mode and the second power saving mode, or return from the first power saving mode and the second power saving mode may be implemented in common based only on a control signal from the touch panel control unit 210.

Other Exemplary Embodiments

The present disclosure can also be implemented by processing of supplying a program for implementing one or more functions of the above-described exemplary embodiment, to a system or an apparatus via a network or a storage medium, and one or more processors in a computer of the system or the apparatus reading out and executing the program. The present disclosure can also be implemented by a circuit (e.g., application specific integrated circuit (ASIC)) implementing one or more functions.
Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-160113, filed Sep. 25, 2023, which is hereby incorporated by reference herein in its entirety.

What is claimed is:

1. An information processing apparatus comprising:
a touch panel control unit configured to output a touch detection signal in a case where a touch operation on a touch panel is received; and
a first control unit configured to perform control in such a manner as to execute a function of the touch panel,
wherein, in a case where the touch operation on the touch panel is received when a power mode of the information processing apparatus is a power saving mode in which power is not supplied at least to the first control unit, based on a return signal generated by a generation unit based on the touch detection signal, the power mode of the information processing apparatus returns from the power saving mode to a standby mode in which power is supplied at least to the first control unit, and
wherein, in a case where the touch operation on the touch panel is received when the power mode of the information processing apparatus is the standby mode, the generation unit does not generate the return signal even when the generation unit receives the touch detection signal, and the first control unit executes a function of the touch panel based on the touch detection signal.

2. The information processing apparatus according to claim 1,
wherein, in a case where the touch panel detects a touch operation, the touch panel control unit outputs a first touch detection signal for notification of detection of the touch operation and a second touch detection signal indicating coordinate information regarding a coordinate at which the touch operation has been received, and
wherein, in the case where the touch operation on the touch panel is received when the power mode of the information processing apparatus is the standby mode, the first control unit executes a function of the touch panel based on the second touch detection signal.

3. The information processing apparatus according to claim 2, further comprising a second control unit that is different from the first control unit and configured to control an operation of the information processing apparatus,
wherein, in a case where the first control unit receives the second touch detection signal, the first control unit transmits a communication signal to the second control unit, and the second control unit controls an operation of the information processing apparatus based on the communication signal.

4. The information processing apparatus according to claim 2, wherein, in a case where the first control unit receives the first touch detection signal when a power mode of the information processing apparatus is the standby mode in which power is supplied at least to the first control unit, the first control unit transmits a control signal to the touch panel control unit, and when the touch panel control unit receives the control signal, the touch panel control unit outputs the second touch detection signal.

5. The information processing apparatus according to claim 4, wherein, in a case where the touch panel control unit receives the control signal, the touch panel control unit performs correction of the touch panel.

6. The information processing apparatus according to claim 5, wherein the correction of the touch panel is correction of a coordinate deviation in the coordinate information regarding the coordinate at which the touch operation has been received.

7. The information processing apparatus according to claim 5, wherein the correction of the touch panel is correction of a pressing pressure at which the touch operation has been received.

8. The information processing apparatus according to claim 1, wherein the touch panel control unit connects to the first control unit and the generation unit, and in a case where a touch operation on the touch panel is received, the touch panel control unit outputs the touch detection signal to the first control unit and the generation unit.

9. The information processing apparatus according to claim 1, wherein, in a case where the generation unit receives the touch detection signal in the standby mode, the generation unit avoids generating the return signal by generating a disabled signal.

10. The information processing apparatus according to claim 1, wherein, in the standby mode, the generation unit avoids generating the return signal by disabling the touch detection signal.

11. A control method of an information processing apparatus including
a control unit configured to execute a function of a touch panel, the control method comprising:
outputting a touch detection signal by a touch panel control unit in a case where a touch operation on the touch panel is received;
executing a function of the touch panel by the control unit if a touch operation on the touch panel is received;

in a case where the touch operation on the touch panel is received when a power mode of the information processing apparatus is a power saving mode in which power is not supplied at least to the control unit, based on a return signal generated based on the touch operation on the touch panel, returning the information processing apparatus from the power saving mode to a standby mode; and in a case where the touch operation on the touch panel is received when the power mode of the information processing apparatus is a standby mode in which power is supplied at least to the control unit, executing a function of the touch panel by the control unit based on the touch operation on the touch panel without generating the return signal without generating the return signal even when a generation unit receives the touch detection signal.

* * * * *